United States Patent
Larkiala et al.

(10) Patent No.: US 12,378,698 B2
(45) Date of Patent: Aug. 5, 2025

(54) COAGULATION BATH SYSTEM FOR FIBER SPINNING

(71) Applicant: Aalto University Foundation sr, Aalto (FI)

(72) Inventors: Sauli Larkiala, Aalto (FI); Chamseddine Guizani, Aalto (FI)

(73) Assignee: Aalto University Foundation sr, Aalto (FI)

(*) Notice: Subject to any disclaimer, the term of this patent is extended or adjusted under 35 U.S.C. 154(b) by 232 days.

(21) Appl. No.: 17/800,247

(22) PCT Filed: Feb. 15, 2021

(86) PCT No.: PCT/FI2021/050104
§ 371 (c)(1),
(2) Date: Aug. 17, 2022

(87) PCT Pub. No.: WO2021/165572
PCT Pub. Date: Aug. 26, 2021

(65) Prior Publication Data
US 2023/0066995 A1   Mar. 2, 2023

(30) Foreign Application Priority Data
Feb. 18, 2020   (FI) .................................. 20205163

(51) Int. Cl.
*D01D 5/06*   (2006.01)
*D01D 7/00*   (2006.01)
(Continued)

(52) U.S. Cl.
CPC ............... *D01D 5/06* (2013.01); *D01D 7/00* (2013.01); *D01H 13/00* (2013.01); *D01H 13/02* (2013.01);
(Continued)

(58) Field of Classification Search
CPC D01D 5/06; D01D 7/00; D01H 13/00; D01H 13/02
See application file for complete search history.

(56) References Cited

U.S. PATENT DOCUMENTS 5,871,680 A * 2/1999 Macheras ................ D01D 5/24
264/211.13
2011/0045297 A1 * 2/2011 Lee ......................... D01F 6/605
264/178 R
(Continued)

FOREIGN PATENT DOCUMENTS

WO   2011/134717 A1   11/2011
WO   2019/077208 A1   4/2019

OTHER PUBLICATIONS

PCT International Search Report for PCT Application No. PCT/FI2021/050104 mailed May 4, 2021 (4 pages).
(Continued)

*Primary Examiner* — Emmanuel S Luk
(74) *Attorney, Agent, or Firm* — Merchant & Gould P.C.

(57) ABSTRACT

A coagulation bath system for fiber spinning, the system comprising a coagulation bath configured to have coagulation liquid consisting of at least partly of water, and forming a water flow, which coagulation liquid is arranged to receive fibers, the water flow drives the movement of fibers through the coagulation bath.

12 Claims, 7 Drawing Sheets

(51) Int. Cl.
*D01H 13/00* (2006.01)
*D01H 13/02* (2006.01)

(52) U.S. Cl.
CPC .... *D10B 2201/24* (2013.01); *D10B 2401/063* (2013.01)

(56) References Cited

U.S. PATENT DOCUMENTS

| | | | |
|---|---|---|---|
| 2014/0151914 A1* | 6/2014 | Rovellini | D01D 10/0454 425/66 |
| 2015/0376391 A1* | 12/2015 | Francalanci | B01F 25/42 524/173 |
| 2022/0186405 A1* | 6/2022 | Tamura | D01D 5/06 |

OTHER PUBLICATIONS

PCT Written Opinion for PCT Application No. PCT/FI2021/050104 mailed May 4, 2021 (7 pages).

Klar et al., "Spinning Approach for Cellulose Fiber Yarn Using a Deep Eutectic Solvent and an Inclined Channel," ACS Omega, 2018, 3:10918-10926.

* cited by examiner

COAGULATION BATH SYSTEM FOR FIBER SPINNING

CROSS-REFERENCE TO RELATED APPLICATIONS

This application is a National Stage Application of PCT/FI2021/050104, filed 15 Feb. 2021, which claims benefit of Ser. No. 20/205,163, filed 18 Feb. 2020 in Finland, and which applications are incorporated herein by reference. To the extent appropriate, a claim of priority is made to each of the above disclosed applications.

TECHNICAL FIELD

The invention presents a novel design of a low-volume spin bath with which we could achieve very satisfactory spinning stability. Good dope spinnability and preserved fiber properties could be achieved in a coagulation bath containing up to 30 wt. % ionic liquid. Those results have a high relevance regarding the upscaling of spinning process that is based on the dissolution of cellulose in a direct solvent and spinning into an anti-solvent coagulation bath.

BACKGROUND

Industrial-scale cellulose dope spinning in a continuous process implies the regeneration of cellulose filaments in a coagulation bath containing an IL/$H_2O$ mixture at the process equilibrium concentration. However, in laboratory tests, the spinning and regeneration of cellulose dopes is mostly performed in a pure water bath and not really representative of a continuous process conditions.

The cellulose filaments regeneration kinetic is controlled by the relative diffusive fluxes of the solvent (IL) from the solution into the bath and the nonsolvent ($H_2O$) from the bath into the gradually forming filament. The diffusive fluxes of the solvent and nonsolvent are proportional to the concentration gradients between the incipient filament and the bath. In addition, the diffusivities of the cation and anion in a $H_2O$/IL mixture may change with the water mole fraction in the coagulation bath. These factors make the regeneration process, and possibly the fiber spinning stability (spinnability) dependent on the bath composition.

Jiang et al. showed that the increase of the 1-Butyl-3-methylimidazolium chloride ([BMIM]Cl) concentration in the coagulation bath from 0 to 20 wt. % led to a gradual reduction in the diffusion coefficients of [BMIM]Cl at a concentration below 5 wt % and decreased rapidly at higher concentration. They also showed that the content of [BMIM]Cl in the filament tends to approach the [BMIM]Cl concentration in the initial coagulation bath.

Liu et al. observed that the coagulation rate of an Ammonia/Ammonium thiocyanate-Cellulose ($NH_3$/$NH_4SCN$-Cellulose) solution decreased with increasing $NH_4SCN$ concentration in the coagulation bath and explained this by the dilution effect, which reduced the concentration gradient and thus the diffusion driving potential.

Similarly, using N-Methylmorpholine N-oxide (NMMO) as a cellulose solvent, Biganska et al. found that during the coagulation of cellulose—$H_2O$-NMMO dopes, the diffusivities of $H_2O$ and NMMO decrease when increasing the NMMO concentration in the coagulation bath. The same authors found that the morphology of a regenerated cellulose object from a solution in NMMO-water is little affected by the cellulose concentration or the bath composition, but strongly dependent on the state of the solution prior to regeneration.

Apart from studies on the bath composition effects on the diffusion rates and fiber morphology, we could not find data in the literature on cellulose dope spinning in $H_2O$/IL mixtures. In order to scale up IL-based fiber spinning, spinning experiments in IL/$H_2O$ mixtures to simulate the conditions of an industrial-scale continuous process, it is mandatory to investigate the influence of increasing IL concentrations in the coagulation bath on spinnability and fiber properties. Critical information about the IL concentration limits in the coagulation bath to ensure good spinnability and fibers properties are essential for process up scaling and optimization. For ILs, the high solvent cost in combination with an un-optimized spin bath volume make those tests often impossible or highly expensive.

The current approach for coagulation bath design consists of a high volume rectangular or trapezoidal tank with an open top part. The bath is equipped with rotating roller or deflecting rods located at bottom. The regeneration of produced fibers takes place between the top water surface and the bottom roller. A certain height is therefore required for the bath to ensure the regeneration before the filament reaches the roller.

During the spinning process start phase, the filaments need to be handled manually, pulled from the bath around the rotating roller and winded on the take-up godets in order to start the draw. This manual operation requires a minimum width of the bath so that the manual start operation could be done, which is around 100 mm.

Altogether, those required dimensions make the bath volume relatively large compared to fiber volume floating through the system. As mentioned earlier, large bath volume implies high expenses for ionic liquids or any other cellulose solvent and handling of large liquid volumes. It also adds other expenses related to the separation and recycling of the solvent and water. Typically, thermal methods like evaporation are used for such recycling steps.

The rotating roller or deflection rod at bottom of bath guides the filaments to the collecting rollers located at the bath exit. Rotating motion requires a constant force to keep rotational speed staple. This force acts against the friction force between water/solvent mixture and the surface of roller or rod. The force is created by pulling the filaments up from the spin bath.

Broken fibers tend to collect around the outer surface of the rollers. This causes the roller surface rougher and change outer diameter. These variations cause more filament breakages, and ultimately stopping the production for cleaning purposes.

Reducing the volume of a spin bath is not a straightforward task as it is limited by factors related to the dope regeneration length (depth of the bath), take-up angle (length of the bath) and operator manual access to the filament in order to start the filament take-up at a defined DR (width of the bath).

Preliminary calculations showed that classical rectangular or trapezoidal bath geometries do not allow reducing extensively the volume. Alternative design option is based on a falling-jet reactor as described in. For this type of design, the requirements were:

A sufficiently long water column above the jet exit to assure regeneration;

A wide enough jet exit to allow the filament(s) to pass through;

A moderate water stream at the top surface to minimize turbulences;

A constant water level to ensure a constant air gap;

A moderate water jet velocity at the exit to avoid excessive drag on the filament.

Those requirements are conflicting and difficult to harmonize. Increasing the regeneration length (water column length $\Delta h$) leads to a higher water jet velocity as $v_{jet}=\sqrt{2g\Delta h}$, and to a higher drag force $F_{Dg}$ on the filament. It means also circulating a higher volumetric water flow ($\dot{V}_{H_2O} \propto v_{jet}$) in the coagulation bath, which will also increase the turbulence at the top of the bath reflected in the increase of the Reynolds number ($Re \propto v_{jet}$). In a similar way, increasing the jet exit diameter ($d_{jet}$) leads to a higher volumetric water flow circulation ($\dot{V}_{H_2O} \propto d_{jet}^2$), which will increase the turbulence at the top part of the reactor ($Re \propto d_{jet}^2$).

SUMMARY

Herein a new design of a low-volume spinning bath is presented, which allows over-coming limitations related to the handling and cost of high solvent volumes. It enabled studies on the influence of the IL content in the spin bath on the spinnability and the properties of the resulting regenerated cellulose fiber. Minimized liquid volume in process enables fast and precise temperature control and saving cooling energy. In bigger process scale, the lower bath volume means lower amounts of liquids to handle, lower material costs and savings in energy consumption.

The present invention provides spinning bath which enables to harmonize between the conflicting requirements of falling jet reactor, namely a long enough regeneration length, a wide enough exit diameter, a laminar flow at the top part and a moderate jet velocity at the exit. It also provides a simple spinning bath design without moving components, which enables easy operation at all phases of production. The new design makes also possible to retrieve broken filaments back into production without interrupting e process, which is the case of regular baths equipped with rollers at the bottom.

The new coagulation bath design consists of four main parts. These can be easily connected and dismantled for cleaning. A centrifugal pump that ensures a closed-loop circulation of the coagulation liquid ($H_2O$ or $IL/H_2O$ mixtures) from the spin bath (ex-it tube and overflow) to a water-cooled double-jacketed metallic reservoir. A rotameter allows adjusting the flow rate and the water level in the coagulation bath. Cold water from a chiller flows continuously in the double jacket of the contain-er/exchanger and cools down the coagulation liquid. With this new design, the total volume of the liquid can be less than 5 L.

Main working principle of this system is to use flowing water as driving force for fibers through the system at start up. That applies also for any broken filaments, which may appear during production. When system is operating, the water flow drives the movement of fibers through bath.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings:

FIG. 1 shows exemplary embodiment of the device (general picture, line drawing with different components of the system, FIG. 2 shows (a) A color plot of the velocity magnitude in a 2-D longitudinal cut of the spin bath; zooms on the upper part in a longitudinal cut and in a cross section cut at the inlet level are shown respectively in (b) and (c); a zoom on the conical bottom part and the curved tube (d). In (b), (c) and (d), the velocity arrow field is superimposed on the velocity magnitude color plot, FIG. 3 shows monofilament spinning time vs. draw ratio (DR) for the different L/D of the spinneret capillary. Open symbols: operator stops intentionally the spinning. Closed symbols: the filament breaks, FIG. 4 (a): Normalized IL fraction (with respect to the initial IL concentration) in the filament cross section as a function of time. The color bar refers to the IL fraction; (b) Integrated IL fraction over the filament cross section as a function of the travelled distance in the bath. Spinning conditions: DR=10, $v_{ext}$=1.9 m/min, bath temperature=10° C., FIG. 5 shows fiber properties as a function of the DR for the different L/D in the spinneret capillary. Spinning conditions: $v_{ext}$=1.9 m/min, bath temperature=10° C., FIG. 6 shows monofilament spinning time vs. DR for the different IL concentrations in the spin bath. Open symbols: operator stops intentionally the spinning. Closed symbols: the filament breaks. Spinning conditions: $v_{ext}$=1.9 m/min, bath temperature=10° C., FIG. 7 shows fibers properties as a function of the DR for the different IL concentrations in the bath. Spinning conditions: $v_{ext}$=1.9 m/min, bath temperature=10° C., FIG. 8 shows SEM images of fibers spun at DR 12 with 0 to 30 wt. % of IL in the coagulation bath, FIG. 9 shows SEM images of fibers spun at DR 8 with 0 and 45 wt. % IL in the coagulation bath, FIG. 10 shows a simplified coagulation bath system, and FIG. 11 shows an embodiment of the coagulation bath system.

DETAILED DESCRIPTION

Figure 1:
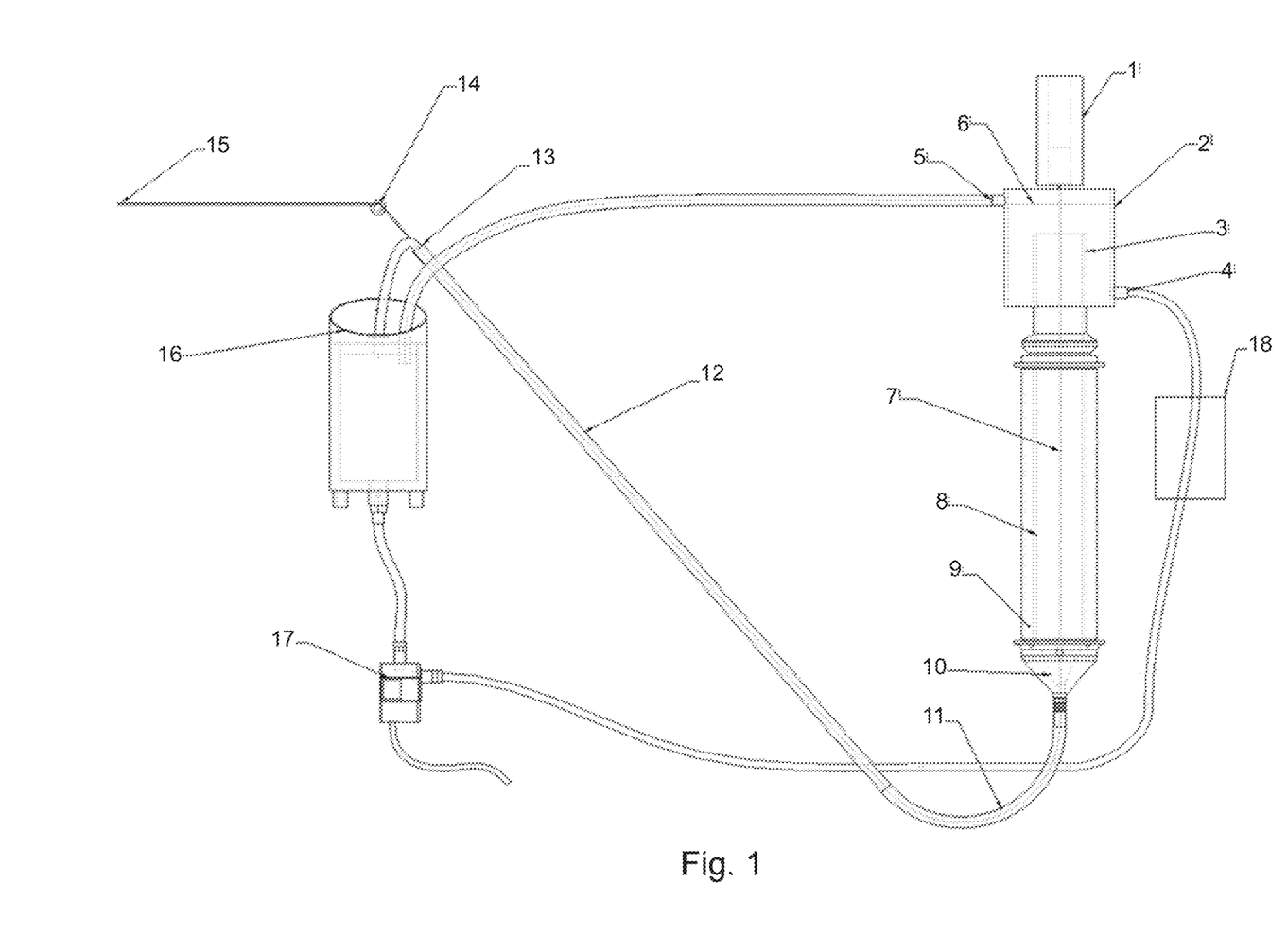

This design of the spinning unit is illustrated in FIG. 1 can be divided into components listed below.

(1) Spinning unit
(2) Outer part of an upper part formed of two concentric cylinders
(3) Inner part of upper part formed of two concentric cylinders
(4) water circulation inlet
(5) Overflow port
(6) Water level in upper part
(7) Filament bundle
(8) Inner tube of a middle cylindrical part
(9) Coolant liquid for heat exchanger
(10) A bottom conical part
(11) Exit tube with desired Radius and diameter
(12) Exit tube straight section
(13) Outflow from exit tube
(14) Guide roll for filament alignment with exit tube
(15) Filaments to collecting rolls
(16) Storage tank with heat exchange surface
(17) Circulation pump
(18) Rotameter Height difference $\Delta h$ between the top surface of the water 6 in the coagulation bath and the tube exit 13 is only of few centimeters (2-3 cm), while the regeneration length is about 1.9 m. This enables to reduce water flow velocity through coagulation bath and control precisely drag force created into fibers.

The spinning unit 1 is located at the top right of the figure. Dope is extruded via a piston into the coagulation bath through a spinneret. The coagulation bath is located just below the spinneret 1 and fixed on a frame which vertical position can be controlled. The coagulation bath consists of four parts, which can be easily connected and dismantled for cleaning:

An upper part 2,3,4,5 having two connections for the fluid inlet (bottom right, 4) and overflow (top left, 5). Two concentric cylinders (3 and 4) form this upper part. The annular zone between the outer and inner cylinder helps to reduce the fluid velocity and flow turbulence as it provides a greater area for the fluid to flow in and reduces its velocity close to the filament penetrating the coagulation fluid. Part of the fluid flows downward and the other part through the overflow in order to maintain a constant fluid level inside the bath.

A middle cylindrical part 8 with a desired diameter and a length.

A bottom conical part 10 ending with exit tube diameter.

An exit tube consists of tube with radius 11 connected to upward directed tube 12.

A centrifugal pump 17 ensures a closed-loop circulation of the coagulation liquid ($H_2O$ or $IL/H_2O$ mixtures) from the spin bath (exit tube and overflow) to a water-cooled double-jacketed metallic reservoir 16. A rotameter 18 allows adjusting the flow rate and the water level in the coagulation bath. With this configuration, nearly 70% of the flow returns into the container through the overflow 5, and 30% through the exit tube 11. Ratio can be adjusted by changing height difference Δh and altering velocity of flow through rotameter. Cold water from a chiller flows continuously in the double jacket of the container/exchanger and cools down the coagulation liquid. With this new design, the total volume of the liquid is less than 5 L.

When the filament enters the coagulation bath, several forces act on it: the gravity force, the buoyancy force, the viscous friction and the water drag force. The resultant force is directed downward without being too high to induce a visible filament stretch. The fluid streamlines, initially parallel in the cylindrical middle part, converge in the conical bottom part toward the exit of the cone. As the velocity vector field is tangent to the streamlines, the resultant drag force directs the filaments toward the cone exit. A visible but mild-stretch can be observed in the filament when it enters the conical part.

The continuous diameter reduction in the conical part allows a smooth and continuous increase of the water velocity and of the total drag force. Once the filament arrives at the bottom of the conical part, the fluid velocity is high enough to induce a drag force that "drives" the filament in the upward direction, towards the jet exit. The operator simply takes it at the exit of the jet 13 and can start the take up operation. During normal production systems does not require any adjustments. If a broken filament is present in the liquid, it can be returned carried out by the flowing liquid and recovered at the exit of the tube. This can be done without interruption in normal production. Compared to traditional spin bath this invention easies operating spinning and handling filaments. The simple bath structure without moving components allows the production of high-quality fibers.

Altering the dimensions of system is possible within some limitations. Optimal size and materials of the different bath components depends on the produced fibers. Inside the cylinder 3, the diameter should be at least the same or larger than the spinnerets hole pattern diameter to allow fibers flow through the first sections until reaching the conical part. The exit tube materials can vary, but it's preferred to use ones with low friction coefficients between the wet fibers and tube material. System can be made from glass, which makes system chemically resistant. The radius 11 can be changed. The friction force is divided along contact surface, but in principle the total force is constant.

If system volume reduction is preferred, storage tank 16 and outer cylinder 3 diameters can be modified within the limits mentioned earlier. The purpose of the overflow is to keep water level 6 as stable as possible.

Storage tank should include filter to avoid any broken filaments to flow into circulation pump. The present invention will be further illustrated by means of the following non-limiting examples.

Example 1: Hydrodynamics in the Spin Bath

The following example illustrates the hydrodynamics in the spin bath. The total circulated water flow is about 1.9-2 L/min. With this water flow rate, we could operate with very low turbulences in the bath, have a very still water surface at the top of the bath, and recover the filament at the exit of the tube to start the take up operation). In order to have more insight on the fluid flow dynamics, the water flow inside the new coagulation bath was simulated using COMSOL Multiphysics, by solving numerically the continuity and the Navier and Stockes equations in the bath geometry, considering:

a steady state, 3-D model.
an incompressible flow in a laminar regime (low enough Reynolds and Mach numbers);
The continuity equation then reads:

$$\rho \nabla \cdot v = 0 \qquad (1)$$

The Navier and Stokes equation reads:

$$\rho(v \cdot \nabla)v = \nabla \cdot [-pI+K] + \rho g \qquad (2)$$

$$K = \mu(\nabla v + (\nabla v)^\tau) \qquad (3)$$

These two equations are at the center of fluid flow modeling. Solving them, for a particular set of boundary conditions (such as inlets, outlets, and walls), predicts the fluid velocity and its pressure in a given geometry.

The boundary conditions were defined as:
a constant volumetric flow of 1.9 l/min at the inlet (upper part);
a constant pressure at the outlet (overflow and exit tube);
a zero-slip velocity at the bath walls and at the bath top surface.

A predefined physics-controlled mesh (fine mesh) was used to dissect the bath geometry into 21899 domain elements, 4624 boundary elements, and 955 edge elements.

Figure 2:
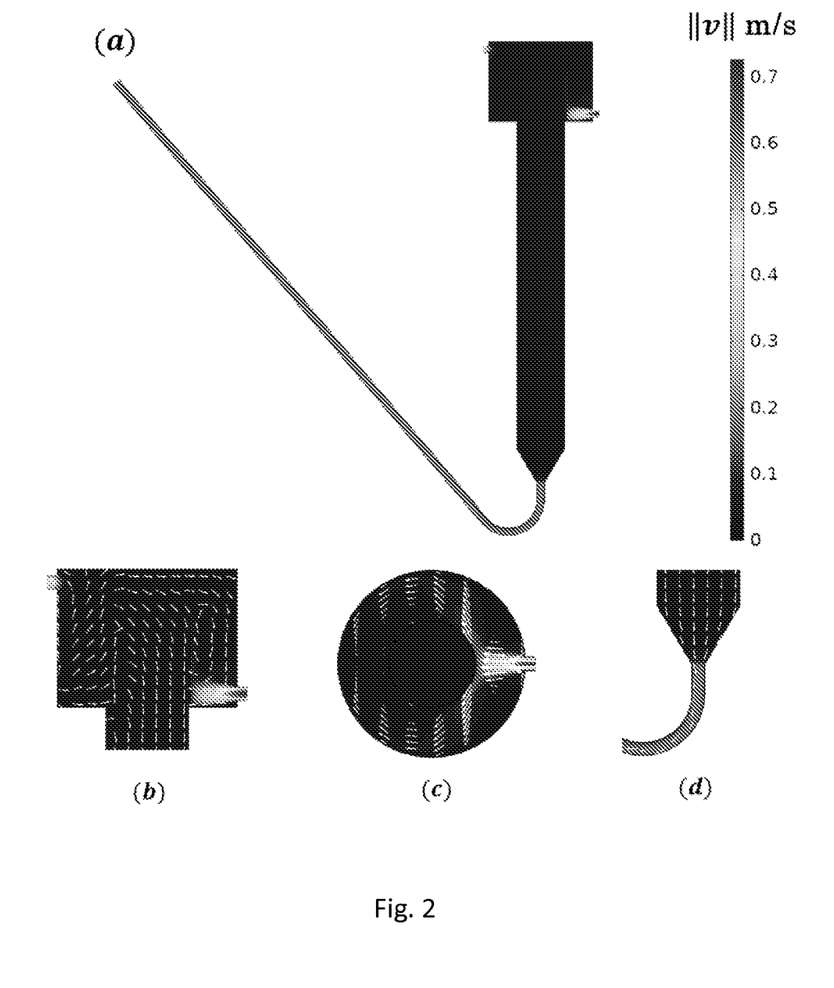

Simulation results showing the water velocity magnitude and field are depicted in FIG. 2. From the different 2-D sections shown in this figure, it can be seen how the fluid velocity drops when flowing from the inlet into the annular space of the upper part of the coagulation bath and increases afterwards close to the exit of the conical bottom part. The average Reynolds number was 22 in the annular space and 146 in the middle cylindrical part of the reactor, respectively. It increases to around 950 at the level of the exit tube. The simulation results give indeed more insights about the flow dynamics inside this new coagulation bath. The simulation also predicts that around 70% of the total flow goes through the overflow exit, and 30% goes through the exit tube. Those values are quite in line with what we measured experimentally, and respective deviations are less than 4%.

Example 2: Dope Spinnability in a Pure Water Bath

Figure 3:
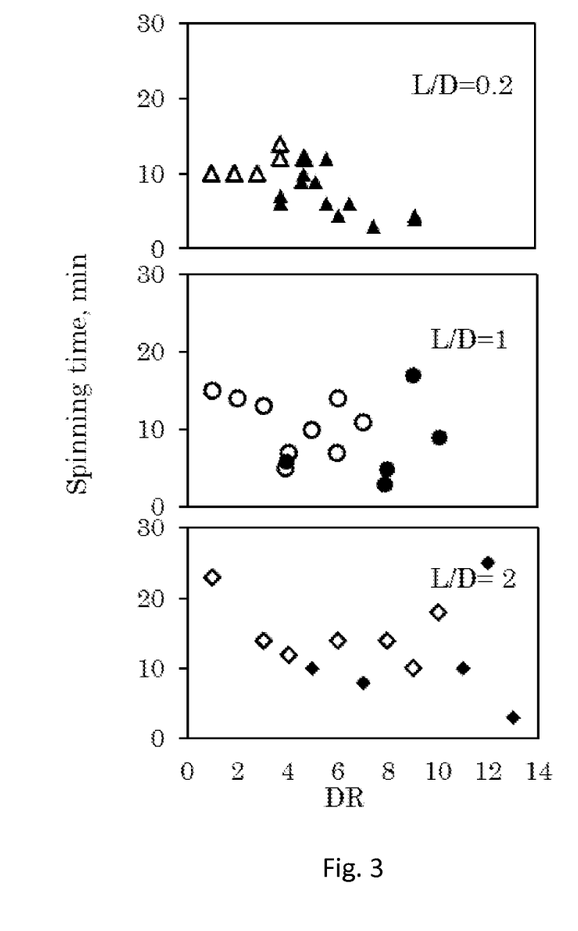

Dope spinning trials were performed in order to assess the spinnability performance using the novel coagulation bath. Three different spinneret aspect ratios (capillary length L over capillary diameter D) were used to evaluate the spinnability and resulting fibers properties. The spinnability results (time vs. DR) are shown in FIG. 3.

The spinnability results show that dope spinning at a DR 10 was possible regardless of the spinneret aspect ratio. The dope spinnability is clearly better than previously reported, with higher spinning durations and higher achievable DR [13], [14].

We observed equally that the spinnability is improved when increasing the spinneret aspect ratio (L/D). Continuous spinning for a duration as high as 25 min was possible at a DR of 12 with an L/D=2. Previously, Hauru et al. also found that increasing the aspect ratio allowed them to reach higher DR, but remained nonetheless lower than the maximum DR reported for multifilament spinning, due to inherent limitations in the previous suboptimal experimental device [13], [14].

It is worth noting here that when the filament breaks, the breakage occurred mainly at the top part of the reactor close to the coagulation bath surface. It was very scarce that breakages occurred at the bottom-curved part of the exit of the tube. This location was initially thought to be the most critical part, where high frictions are to be expected between the filament and the silicon tube surface.

This was not the case. One reason might be that the water inside the exit tube works as a lubricant and reduces the friction between the filament and curved silicon tube wall.

The successful spinning observed in this new bath is also due to the sufficient regeneration length provided to the incipient filament during the dope coagulation process. Indeed, in order to remove the IL and regenerate the cellulose filament, the residence time of the incipient filament inside the bath must be long enough to allow the diffusion of the IL in the bath and water inside the filament. This residence time can be translated into a regeneration length by simply multiplying it by the take up velocity. It is therefore interesting to evaluate the regeneration length during typical spinning experiments, and compare it to the regeneration length provided in the new set-up. For this, a simulation of the diffusion of IL and water from/into the incipient filament during the spinning in this novel coagulation bath. The aim is to estimate the residual IL concentration in the filament at the exit point. In this simulation, we considered the case of spinning at a DR 10 with an extrusion velocity of 1.9 m/min, which was experimentally successful regardless of the spinneret aspect ratio. We assume here that all the stretch occurs in the air gap. Conservation of mass leads to a wet incipient filament radius of 15.8 µm when entering the coagulation bath. The diffusion coefficient of [DBNH][OAc] and $H_2O$ were previously determined in [2] and used in the present simulation.

The diffusion of IL and $H_2O$ is modeled with a time dependent, 1-D axisymmetric model using the software COMSOL Multiphysics.

The diffusion equation according to Fick's second law reads:

$$\frac{dC_i}{dt} = -\nabla \cdot (-D_i \nabla C_i), i = H_2O, IL \quad (1)$$

The initial concentrations for water and IL concentrations in the incipient filament are:

$$C_{H_2O}(r,0)=0 \quad (2)$$

$$C_{IL}(r,0)=C_{IL0} \quad (3)$$

The boundary conditions are:
At the filament surface (r=R), constant concentrations are applied:

$$C_{H_2O}(R,t)=C_{H_2O}{}^{\partial\Omega} \quad (4)$$

$$C_{IL}(R,t)=0 \quad (5)$$

At the filament center (r=0), a symmetry condition is considered:

$$\frac{dC_i}{dr}(0, t) = 0 \quad (6)$$

The filament radius (15.8 µm) was divided into 50 elements using the predefined physics-controlled mesh generation.

Figure 4:
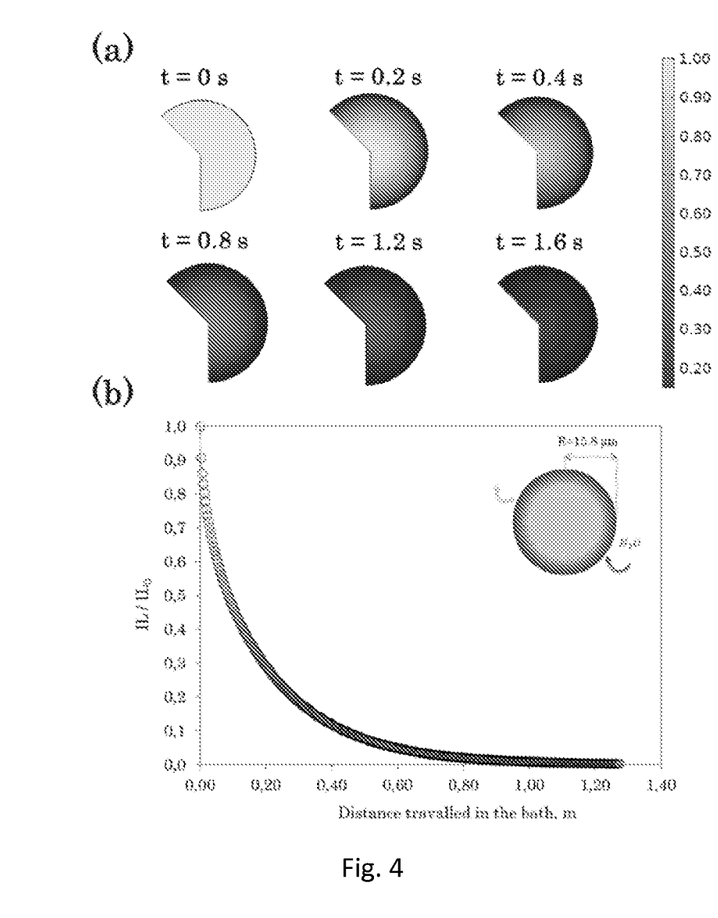

Simulation were run for a maximum duration of 4 s with a time step of 0.01 s. The simulation results are depicted in FIG. 4. This figure shows the normalized IL fraction (with respect to the initial IL concentration) in the filament cross section as a function of time. The reader can notice that at 1.6 s almost all of the IL diffused in the coagulation bath.

As stated earlier, the time scale can be converted to a distance traveled by the filament inside the bath, by multiplying it with the filament take-up velocity. The resulting take-up velocity is therefore 19.1 m/min, and the 1.6 s corresponds then to a traveled distance of 0.51 m inside the coagulation bath.

To better illustrate the simulation results, the integrated IL fraction over the filament cross section as a function of the travelled distance in the bath is depicted in FIG. 4.b. The reader can clearly see that when the filament travels 1 m in the spin bath, the IL content in the filament has already dropped to almost 7%. The distance from the top of the water surface to the jet exit is about 1.9 m, substantially longer than the required distance of 1 m in this case, for the near-complete diffusion of the IL in the spin bath.

Overall, these results show that with this novel, low-volume bath design, the dope spinnability and filament regeneration were successful at relatively high DR and long spinning times. In addition, the results prove that this newly designed spin bath is suitable for spinning in IL/water mixtures and screening of the main process parameters due to its small volume. The small amount of IL present and accumulated in the spin bath enables its recovery with reasonable working capacity.

Example 3: Fibers Properties after Spinning in Pure Water Bath

Figure 5:
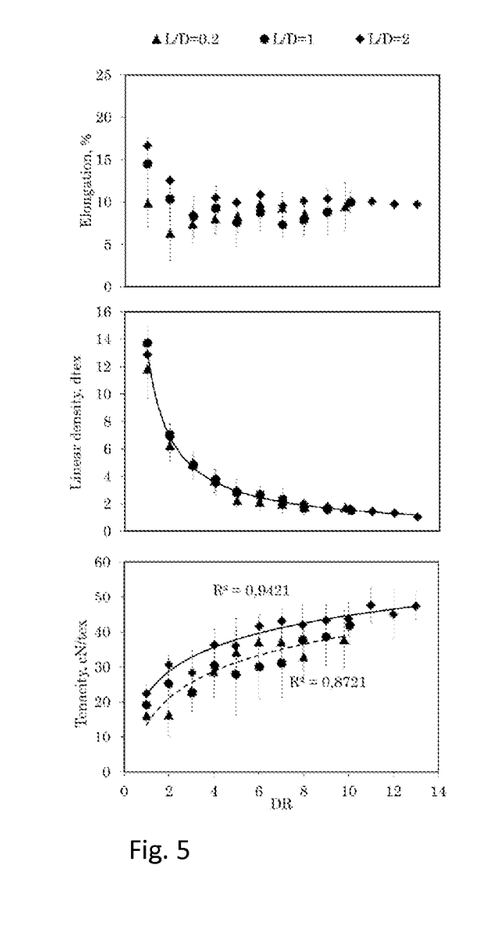
Figure 6:
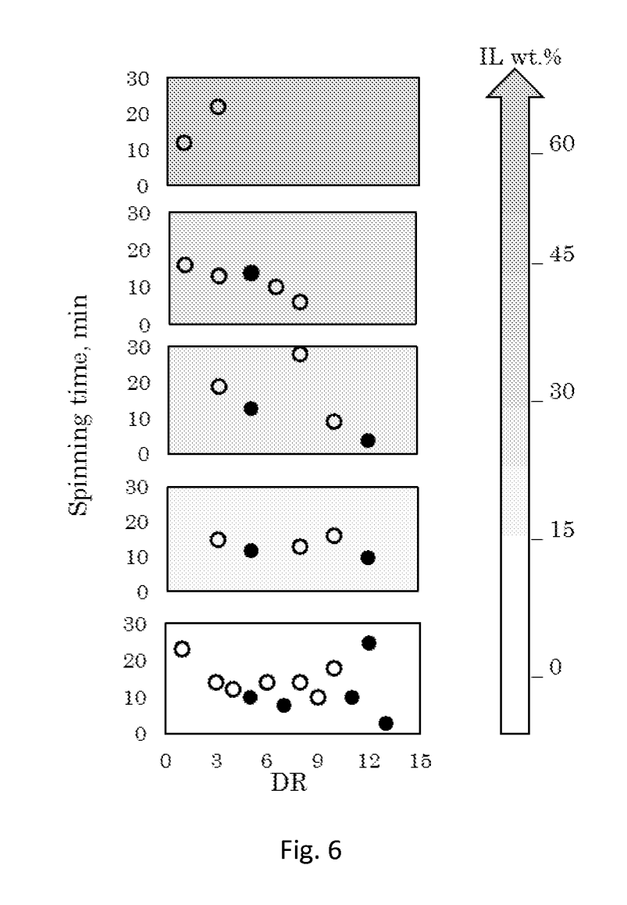

The tenacity, elongation and linear density of the fibers obtained in a water coagulation bath with different L/D ratios are shown in FIG. 5. The evolution of the titer with the DR is almost the same regardless of the L/D ratio in the spinneret. The titer variation with the DR is well represented by an inverse proportion relationship. A slightly better fitting could be obtained when allowing the power coefficient to vary around minus one. The nonlinear least square fitting gives in this case a constant factor and a power coefficient respectively of 13.175 and −0.938. Those values are slightly different from the ones previously determined: 13.88 and −1.236 [2].

As expected, the tenacity increases with the DR. The increase in tenacity levels-off beyond DR 6. Although the statistical significance might be an issue due to relatively large errors bars, there is a trend toward a tenacity improvement when increasing the spinneret L/D ratio. A mathematical fitting of the experimental data with a logarithmic function (R2 of 0.94 and 0.87 respectively for L/D of 0.2 and 2) was added to the plot to help the reader visualizing the differences.

Regardless of the L/D ratio in the spinneret, the fiber elongation decreases markedly between DR 1 and 3, and then stabilizes beyond DR 6. Here again, the elongation values are improved when increasing the L/D, especially for low DR values. The elongation values for the highest L/D are constantly above the ones obtained at low L/D. Nevertheless, the L/D effect is less marked beyond DR 4.

As pointed out previously, the improved fibers properties at higher L/D might be due to a higher shear inside the longer capillary resulting into a higher cellulose chains orientation, which translates to better mechanical properties of the resulting fibers [13].

Example 4: Spinning in IL/H$_2$O Mixtures

Increasing the IL concentration further to 60 wt. % resulted in a drop of the maximal achievable DR to 3. Although the DR is low, the result is still impressive regarding the high IL concentration in the bath. Beyond this DR, the spinning was not stable at all.

Referring to the literature, we could not find similar results relating the dope spinnability to the IL concentration in the spin bath, as in most of the studies, the cellulose regeneration and dope spinnability is reported in a pure water bath [15]. Those results are of high value regarding the upscaling of any spinning process using ionic liquids or any other direct solvent for the dissolution and spinning of lignocellulose. In a continuous process, operating at a relatively high equilibrium concentration of IL in the spin bath implies an energy cost saving in the solvent recovery part, using for instance water evaporation to thermally separate water and IL.

Example 5: Fiber Properties as a Function of the Bath Composition

Titer, Tenacity and Elongation

Figure 7:
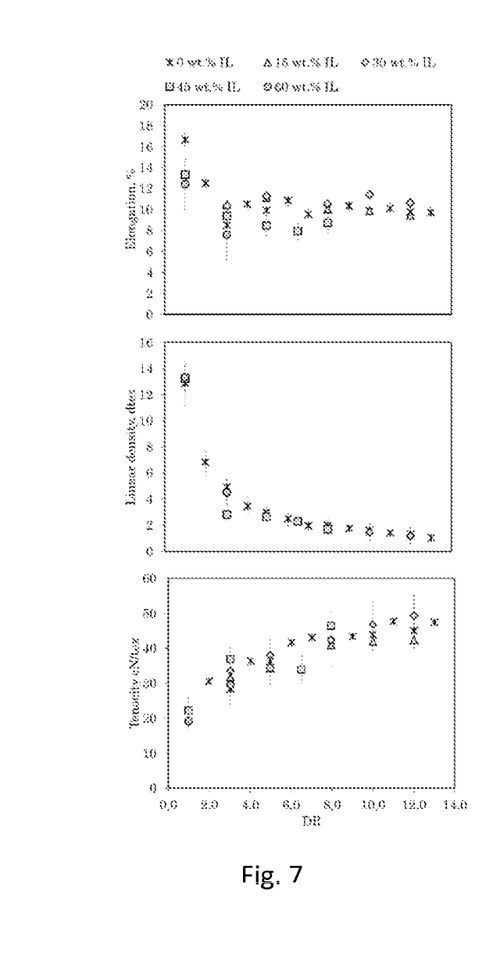

The fiber titer, tenacity and elongation as a function of the DR for the different IL concentrations in the bath are shown in FIG. 7. The fiber titer is, as expected, not affected by the IL concentration in the bath, but only dependent on the DR.

The tenacity does not show any consistent variation with the IL concentration in the spin bath. For instance, the highest tenacity observed at DR 8 corresponds to a fiber spun in a 45 wt. %, while the tenacity values at the other concentrations were almost superimposed. Similarly, at DR 12, the highest tenacity was observed for 30 wt. % IL in the bath, while the lowest was observed at 15 wt. % IL in the bath.

It seems, however, that there is an effect of the IL concentration in the bath on the fiber elongation. Between 0 and 30 wt. % of IL in the bath, the fiber elongation is unaffected by the IL concentration. However, for 45 wt. % and 60 wt. % the fiber elongation decreases in comparison to values obtained at lower IL wt. % in the bath. Those results suggest that going beyond 30 wt. % of IL in the bath may be detrimental to reach acceptable fiber elongation.

Crystalline Structure of the Spun Fibers

The fibers crystallinity and crystal width values as a function of the DR and IL concentration in the spin bath are shown in Table 1.

Crystal size was estimated to be approximately 32 Å for all the samples. As expected from the previous re-ports [16], DR did not alter the crystallite dimension of cellulose II phase. Interestingly, the IL concentration in the bath did not affect the crystal width neither. Recent small angle X-ray scattering study showed the absence of crystallization up to 50% IL concentration for the case of homogenous cellulose solution in [DBNH][OAc][17], and therefore spinodal decomposition was proposed for the regeneration system of cellulose solution in [DBNH][OAc]. Our current study shows that the same size crystallites were recovered after the spinning in 0-60 wt. % IL concentration in the spin bath and subsequent washing by water. Despite cations may bound to cellulose preventing crystallization of cellulose at high IL concentration, spinning was possible at low DR. This result indicates that the shear force during the spinneret extrusion and air-gap already triggers the alignment and nucleation of cellulose chains, and such initial structure formation probably allows the spinning of the dope even under the high IL concentration in the spin bath. If the spinnability is assured by such the initial structure formation, the final crystallites dimension can be same in spun fiber after final washing by water. In other word, the residual IL in the spun fiber during the spinning does not affect the crystalline dimension of cellulose II phase if the fibers were finally washed in the water. A few studies have reported the small increase of CI of Ioncell with respect to DR in the range over DR 2 [16] [18]. Our results were consistent with these studies for 0 wt. % coagulation bath, and only small increase was observed for higher DR samples. Interestingly, slightly different trend was observed when the CI was obtained from higher IL concentration in the coagulation bath. Slightly greater CI was observed for higher IL wt. % concentration only with DR3 fibers, but not with higher DR fibers. This result implies a little benefit for having certain amount of IL in spun fiber before the final washing by water. However, these changes on CI were negligibly small, and no significant improvement was observed.

Overall, those results imply that precipitation kinetics, which vary with the IL concentration in the bath, do not have any significant effect on the final fibers crystalline properties.

TABLE 1

Fibers crystallinity and crystal width values as a function of the DR and IL concentration in the spin bath

| Experimental conditions | | CI (%) | | $CW_{hkl}$ (Å) | |
|---|---|---|---|---|---|
| IL wt. % | DR | 9.0-50.0 | err | average 3 peaks | err |
| 0 | 3 | 35 | 0 | 33 | 0 |
|  | 8 | 37 | 1 | 33 | 0 |
|  | 12 | 37 | 1 | 33 | 0 |
| 15 | 3 | 35 | 3 | 32 | 0 |
|  | 8 | 36 | 0 | 32 | 1 |
|  | 12 | 37 | 0 | 32 | 0 |

TABLE 1-continued

Fibers crystallinity and crystal width values as a function of the DR and IL concentration in the spin bath

| Experimental conditions | | CI (%) | | $CW_{hkl}$ (Å) average 3 peaks | |
|---|---|---|---|---|---|
| IL wt. % | DR | 9.0-50.0 | err | peaks | err |
| 30 | 3 | 36 | 1 | 32 | 1 |
|  | 8 | 37 | 0 | 32 | 0 |
|  | 12 | 36 | 3 | 32 | 0 |
| 45 | 3 | 37 | 0 | 33 | 1 |
|  | 8 | 36 | 0 | 32 | 1 |
| 60 | 3 | 37 | 0 | 32 | 0 |

Fibers Morphology

Figure 8:
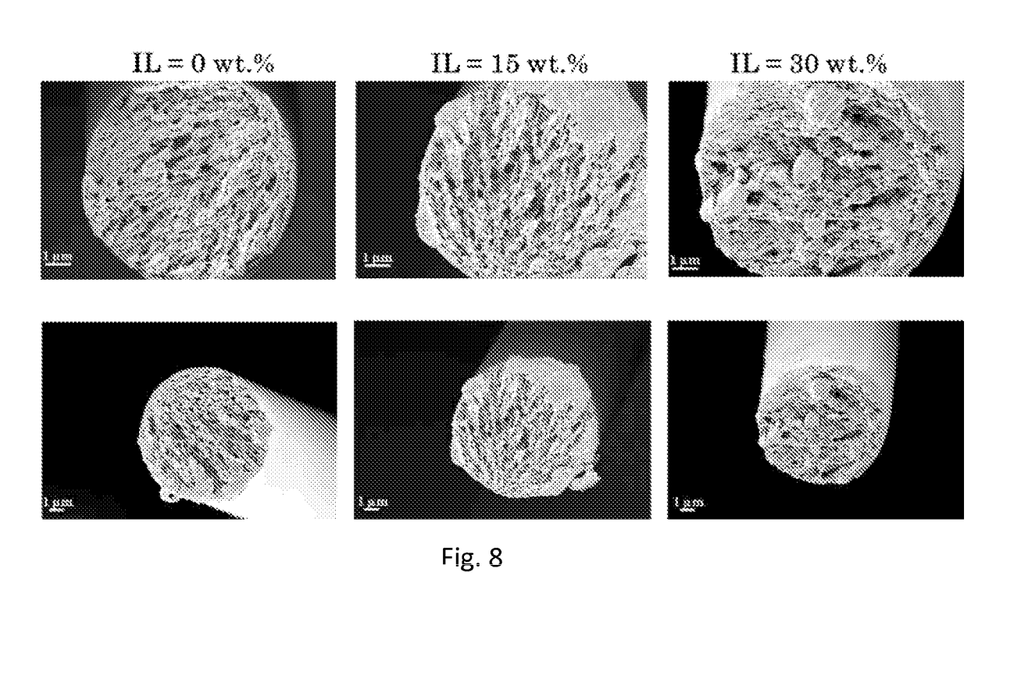

The SEM images of the fibers spun at DR 12 with 0 to 30 wt. % of IL in the coagulation bath are shown in FIG. 8.

Regardless of the IL concentration in the bath, the observed morphology is quite similar between the fibers, i.e. a smooth fiber surface, round cross-section, and homogeneous and dense fibrillary structure[19].

Figure 9:
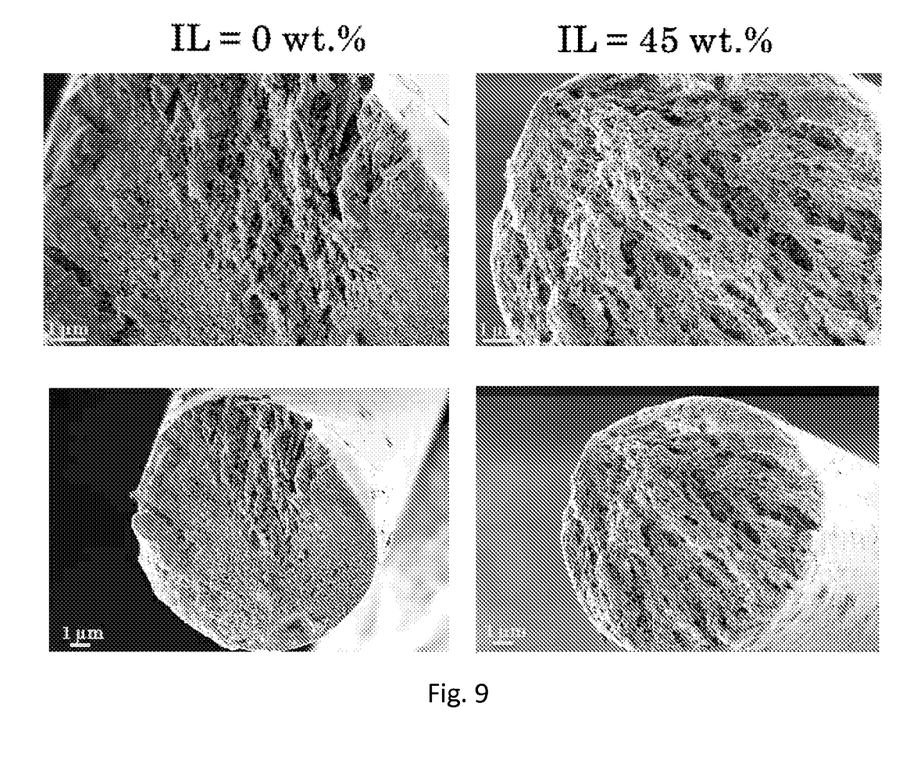

This observation still hold for an IL concentration of 45 wt. % as shown in FIG. 9, in which images of the fibers spun at DR 8 in water and in 45 wt. % IL coagulation bath are compared. Similar results were also reported in [11] on the effect of NNMO concentration in the coagulation bath on the morphology of Lyocell fibers. The authors found that the type of morphology of a regenerated cellulose object from a cellulose solution in NMMO-water is not very much dependent on the cellulose concentration or the bath composition, but strongly dependent on the state of the solution prior to regeneration (crystallized or molten). Liu et al. made also an attempt to correlate the coagulation rate of an $NH_3$/$NH_4SCN$—Cellulose solution in various coagulation conditions, to the corresponding final fiber structure and fiber tensile properties; however, they could not find any correlation. The authors think that this may be due to the fact that the growth rate of the coagulated layer of spinning thread during the process of fiber formation, does not directly govern the composition of the coagulated layer which is believed to be a key factor affecting the fiber structure and consequently the fiber properties [9].

Altogether, those results suggest that in a continuous process, spinning in 30 wt. % IL solution would be perfectly possible and the spun fibers would have properties like those obtained in pure water.

Figure 10:
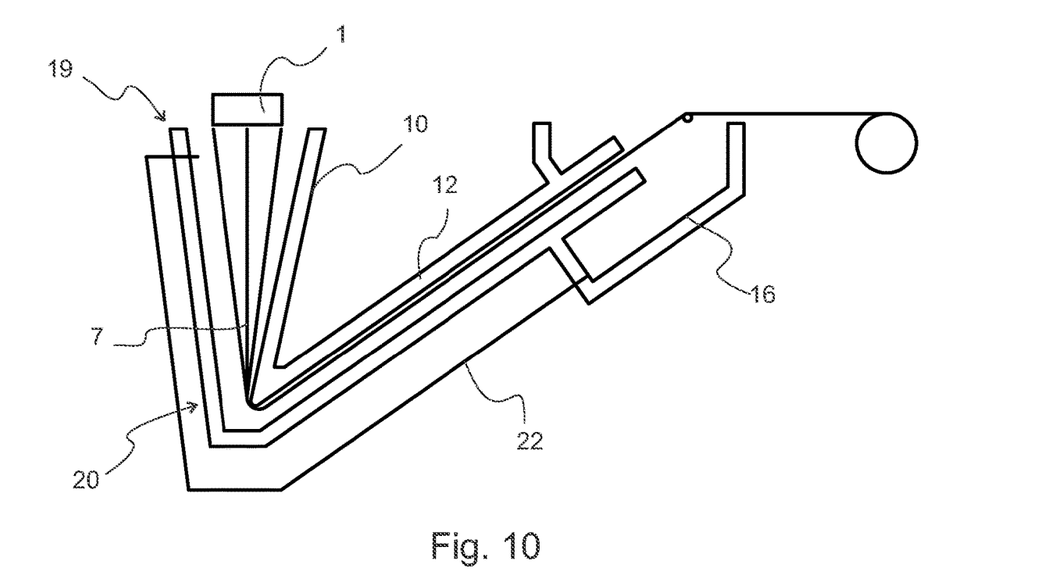

FIG. 10 shows a simplified coagulation bath system, wherein the advantages has been achieved.

Figure 11:
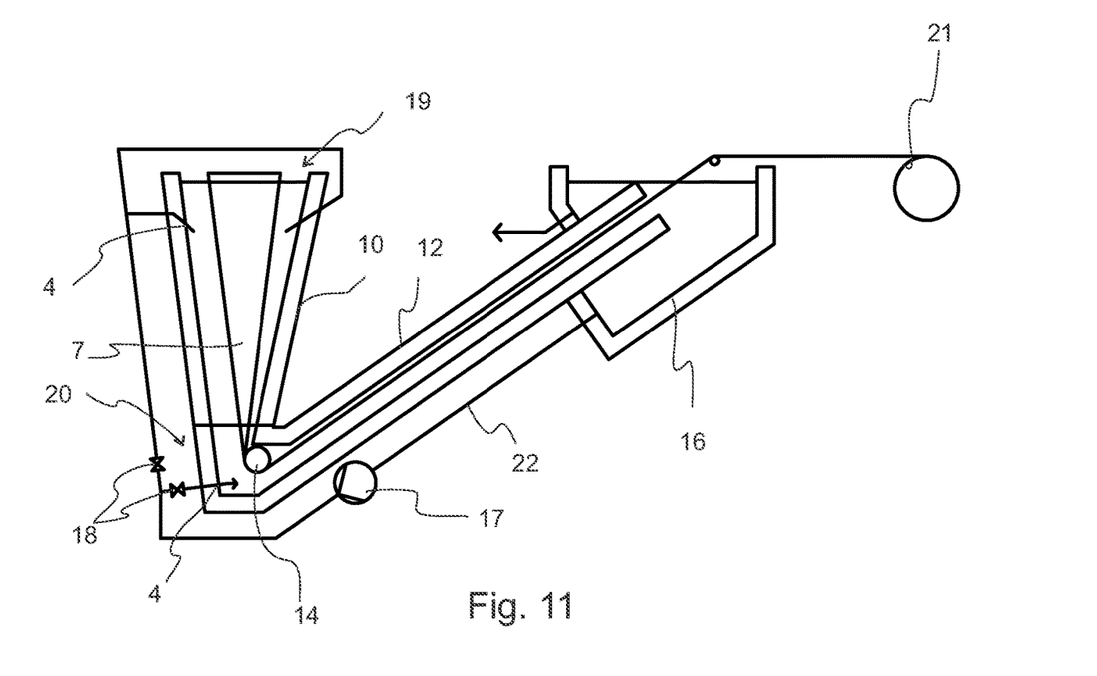

FIG. 11 shows an embodiment of the coagulation bath system.

The aspect of the invention is to provide a coagulation bath system for fiber spinning, the system comprising a coagulation bath configured to have coagulation liquid consisting of at least partly of water, and forming a water flow, which coagulation liquid is arranged to receive fibers, wherein the water flow drives the movement of fibers through the coagulation bath.

In an embodiment, the coagulation bath comprises a conical part configured to narrow from entry 19 to exit, wherein the entry is upstream of the water flow direction and the exit is downstream of the water flow direction, and the coagulation bath is connected to an upward directed tube 12 at the exit 20), wherein the conical part is configured to accelerate the water flow towards the exit.

In an embodiment, the coagulation bath comprises an upper part 2,3,4,5 having two connections for the fluid inlet (bottom right, 4) and overflow (top left, 5). Two concentric cylinders 3 and 4 form this upper part. The annular zone between the outer and inner cylinder helps to reduce the fluid velocity and flow turbulence as it provides a greater area for the fluid to flow in and reduces its velocity close to the filament penetrating the coagulation fluid. Part of the fluid flows downward and the other part through the overflow in order to maintain a constant fluid level inside the bath, a middle cylindrical part 8 with a desired diameter and a length, a bottom conical part 10 ending with exit tube diameter, and an exit tube consists of tube with radius 11 connected to upward directed tube 12.

In an embodiment, a roll 14, which is a motorized roll, is provided at the exit 20 of the conical part for filament alignment with the exit tube, wherein the motorized roll is configured to facilitate the movement of the filament bundle 7 towards the bath exit.

In an embodiment, a drawing godet 21 configured to wind up the filament from the coagulation bath through the exit tube 12.

In an embodiment, rotation speed of the motorized roll is configured to correspond the rotation speed of the drawing godet.

In an embodiment, the coagulation bath comprises transparent lateral walls.

In an embodiment, a reservoir 16, wherein the coagulation liquid is configured to be circulated between the coagulation bath and the reservoir 16 via circulation tubing 22, and the filament bundle is configured to be conducted from the exit tube 12 to the coagulation liquid in the reservoir 16.

In an embodiment, the coagulation bath is water-cooled double-jacket metallic reservoir.

In an embodiment, the coagulation liquid is circulated between the coagulation bath and the reservoir 16 by a pump 17.

In an embodiment, the coagulation bath comprises at least one inlet 4 for receiving circulated coagulation liquid from the reservoir 16 into the coagulation bath.

In an embodiment, the coagulation bath comprises at least two inlets 4 for receiving circulated coagulation liquid from the reservoir 16 into the coagulation bath, wherein the first inlet is arranged near the entry 19 of the coagulation bath, and a second inlet, is arranged near the exit 20 of the coagulation bath.

In an embodiment, at least one rotameter 18 configured to adjust the flow rate of the circulated coagulation liquid from the reservoir to the coagulation bath.

In an embodiment, plurality of rotameters 18 configured to adjust separately the flow rate of the circulated coagulation liquid through each inlet 4.

In an embodiment, the coagulation bath comprises an overflow port 5 for maintaining a constant coagulation liquid level inside the coagulation bath.

Although the invention has been the described in conjunction with a certain type of system, it should be understood that the invention is not limited to any certain type of system. While the present inventions have been described in connection with a number of exemplary embodiments, and implementations, the present inventions are not so limited, but rather cover various modifications, and equivalent arrangements, which fall within the purview of prospective claims.

LITERATURE

[1] A. Michud, M. Hummel, and H. Sixta, "Influence of process parameters on the structure formation of man-made cellulosic fibers from ionic liquid solution," *J. Appl. Polym. Sci.*, vol. 133, no. 30, pp. 1-9, 2016.

[2] L. K. J. Hauru, M. Hummel, K. Nieminen, A. Michud, and H. Sixta, "Cellulose regeneration and spinnability from ionic liquids," *Soft Matter*, vol. 12, no. 5, pp. 1487-1495, 2016.

[3] S. Asaadi et al., "Renewable High-Performance Fibers from the Chemical Recycling of Cotton Waste Utilizing an Ionic Liquid," *ChemSusChem*, vol. 9, no. 22, pp. 3250-3258, 2016.

[4] Y. Ma, M. Hummel, I. Kontro, and H. Sixta, "High performance man-made cellulosic fibres from recycled newsprint," *Green Chem.*, vol. 20, no. 1, pp. 160-169, 2018.

[5] C. Olsson and G. Westman, "Wet spinning of cellulose from ionic liquid solutions-viscometry and mechanical performance," *J. Appl. Polym. Sci.*, vol. 127, no. 6, pp. 4542-4548, 2013.

[6] A. Hedlund, T. Köhnke, and H. Theliander, "Diffusion in Ionic Liquid-Cellulose Solutions during Coagulation in Water: Mass Transport and Coagulation Rate Measurements," *Macromolecules*, vol. 50, no. 21, pp. 8707-8719, 2017.

[7] C. A. Hall et al., "Macroscopic and Microscopic Study of 1-Ethyl-3-methyl-imidazolium Acetate-Water Mixtures," *J. Phys. Chem. B*, vol. 116, no. 42, pp. 12810-12818, 2012.

[8] G. Jiang et al., "Diffusion dynamics of 1-Butyl-3-methylimidazolium chloride from cellulose filament during coagulation process," *Cellulose*, vol. 18, no. 4, pp. 921-928, 2011.

[9] C.-k Liu, J. A. Cuculo, and B. Smith, "Coagulation studies for cellulose in the ammonia/ammonium thiocyanate ($NH_3/NH_4SCN$) direct solvent system," *J. Polym. Sci. Part B Polym. Phys.*, vol. 27, no. 12, pp. 2493-2511, 1989.

[10] O. Biganska and P. Navard, "Kinetics of precipitation of cellulose from cellulose-NMMO-water solutions," *Biomacromolecules*, vol. 6, no. 4, pp. 1948-1953, 2005.

[11] O. Biganska and P. Navard, "Morphology of cellulose objects regenerated from cellulose-N-methylmorpholine N-oxide-water solutions," *Cellulose*, vol. 16, no. 2, pp. 179-188, 2009.

[12] A. Hedlund, "Air gap spinning of cellulose fibers from ionic solvents," CHALMERS UNIVERSITY OF TECHNOLOGY, 2013.

[13] L. K. J. Hauru, M. Hummel, A. Michud, and H. Sixta, "Dry jet-wet spinning of strong cellulose filaments from ionic liquid solution," *Cellulose*, vol. 21, no. 6, pp. 4471-4481, 2014.

[14] L. K. J. Hauru, M. Hummel, A. Michud, and H. Sixta, "Erratum to: Dry jet-wet spinning of strong cellulose filaments from ionic liquid solution (Cellulose, (2014), 21, 6, (4471-4481), 10.1007/s10570-014-0414-0)," *Cellulose*, vol. 24, no. 7, pp. 3109-3110, 2017.

[15] F. Hermanutz, M. P. Vocht, N. Panzier, and M. R. Buchmeiser, "Processing of Cellulose Using Ionic Liquids," *Macromol. Mater. Eng.*, vol. 304, no. 2, pp. 1-8, 2019.

[16] S. Asaadi, M. Hummel, P. Ahvenainen, M. Gubitosi, U. Olsson, and H. Sixta, "Structural analysis of Ioncell-F fibres from birch wood," *Carbohydr. Polym.*, vol. 181, no. September 2017, pp. 893-901, 2018.

[17] Y. Nishiyama, S. Asaadi, P. Ahvenainen, and H. Sixta, "Water-induced crystallization and nano-scale spinodal decomposition of cellulose in NMMO and ionic liquid dope," *Cellulose*, vol. 26, no. 1, pp. 281-289, 2019.

[18] H. Sixta et al., "Ioncell-F: A high-strength regenerated cellulose fibre," *Nord. Pulp Pap. Res. J.*, vol. 30, no. 1, pp. 43-57, 2015.

[19] A. Michud et al., "Ioncell-F: ionic liquid-based cellulosic textile fibers as an alternative to viscose and Lyocell," *Text. Res. J.*, vol. 86, no. 5, pp. 543-552, 2016.

The invention claimed is:

1. A coagulation bath system for fiber spinning, the coagulation bath system comprising:
 a coagulation bath and a reservoir, the coagulation bath being configured to have coagulation liquid comprising water, and forming a water flow, the coagulation liquid is arranged to receive fibers,
 wherein the water flow drives movement of the fibers through the coagulation bath,
 wherein the coagulation bath comprises a conical part configured to narrow from an entry to an exit,
 wherein the entry is upstream of a water flow direction and the exit is downstream of the water flow direction, and the coagulation bath is connected to an upward directed tube at the exit,
 wherein the conical part is configured to accelerate the water flow towards the exit,
 wherein the coagulation liquid is configured to be circulated between the coagulation bath and the reservoir via circulation tubing, and a filament bundle is configured to be conducted from the exit to the coagulation liquid in the reservoir,
 wherein the coagulation bath further comprises an upper part having two connections for a fluid inlet and an overflow, two concentric cylinders comprising an outer cylinder and an inner cylinder in the upper part that form an annular zone between the outer cylinder and the inner cylinder thereby reducing a fluid velocity and a flow turbulence of the coagulation liquid by providing a greater area for the coagulation liquid to flow, a part of the coagulation liquid flows downward and another other part of the coagulation liquid flows through the overflow in order to maintain a constant level of the coagulation fluid inside the coagulation bath,
 a middle cylindrical part,
 the conical part including an exit, and
 an exit tube extending from the conical part exit to an upwardly directed tube.

2. The coagulation bath system according to claim 1, wherein a roll, which is a motorized roll, is provided at the conical tube exit for filament alignment with the exit tube, wherein the motorized roll is configured to facilitate the movement of the filament bundle towards the exit.

3. The coagulation bath system according to claim 1, comprising a drawing godet configured to wind up the filament from the coagulation bath through the exit tube.

4. The coagulation bath system according to claim 3, wherein rotation speed of the motorized roll is configured to correspond the rotation speed of the drawing godet.

5. The coagulation bath system according to claim 1, wherein the coagulation bath comprises transparent lateral walls.

6. The coagulation bath system according to claim 1, wherein the coagulation bath is water-cooled double-jacket metallic reservoir.

7. The coagulation bath system according to claim 1, wherein the coagulation liquid is circulated between the coagulation bath and the reservoir by a pump.

8. The coagulation bath system according to claim 1, wherein the coagulation bath comprises at least one inlet for receiving circulated coagulation liquid from the reservoir into the coagulation bath.

9. The coagulation bath system according to claim 8, wherein the coagulation bath comprises at least two inlets for receiving the circulated coagulation liquid from the reservoir into the coagulation bath, wherein the first inlet is arranged near the entry of the coagulation bath, and a second inlet is arranged near the exit of the coagulation bath.

10. The coagulation bath system according to claim 9, comprising plurality of rotameters configured to adjust separately the flow rate of the circulated coagulation liquid through each inlet.

11. The coagulation bath system according to claim 1, comprising at least one rotameter configured to adjust the flow rate of the circulated coagulation liquid from the reservoir to the coagulation bath.

12. The coagulation bath system according to claim 1, wherein the coagulation bath comprises an overflow port for maintaining a constant coagulation liquid level inside the coagulation bath.

\* \* \* \* \*